United States Patent
Fukaya et al.

(12)
(10) Patent No.: US 7,947,361 B2
(45) Date of Patent: May 24, 2011

(54) RELEASE FILM AND PROCESS FOR PRODUCING THE FILM

(75) Inventors: Tomomi Fukaya, Noda (JP); Toshio Sugizaki, Yokohama (JP)

(73) Assignee: Lintec Corporation, Tokyo (JP)

( * ) Notice: Subject to any disclaimer, the term of this patent is extended or adjusted under 35 U.S.C. 154(b) by 991 days.

(21) Appl. No.: 11/653,049

(22) Filed: Jan. 12, 2007

(65) Prior Publication Data

US 2007/0166523 A1  Jul. 19, 2007

(30) Foreign Application Priority Data

Jan. 17, 2006 (JP) ................................. 2006-008878
Jan. 17, 2006 (JP) ................................. 2006-008879

(51) Int. Cl.
*B32B 9/06* (2006.01)
*B32B 27/00* (2006.01)
*B32B 17/10* (2006.01)

(52) U.S. Cl. ........ 428/220; 428/323; 428/332; 428/334; 428/447; 428/500

(58) Field of Classification Search ........................ None
See application file for complete search history.

(56) References Cited

U.S. PATENT DOCUMENTS

| | | | |
|---|---|---|---|
| 7,645,497 B2 * | 1/2010 | Spath et al. ..................... | 428/1.4 |
| 2006/0222814 A1 * | 10/2006 | Takahashi et al. ............ | 428/141 |

FOREIGN PATENT DOCUMENTS

| | | | |
|---|---|---|---|
| JP | 10-006443 | A | 1/1998 |
| JP | 10-006459 | A | 1/1998 |
| JP | 10-086289 | A | 4/1998 |
| JP | 2001-164476 | A | 6/2001 |
| JP | 2002-067209 | A | 3/2002 |
| JP | 2002-179954 | A | 6/2002 |
| JP | 2003-145685 | A | 5/2003 |
| JP | 2003-251756 | A | 9/2003 |
| JP | 2005-153250 | A | 6/2005 |
| JP | 2005-336341 | A | 12/2005 |

OTHER PUBLICATIONS

Notice of Reason(s) of Rejection dated Oct. 22, 2010 in Japanese Patent Application No. 2006-008878.
Notice of Reason(s) of Rejection dated Nov. 8, 2010 in Japanese Patent Application No. 2006-008879.

* cited by examiner

*Primary Examiner* — Sheeba Ahmed
(74) *Attorney, Agent, or Firm* — Holtz, Holtz, Goodman & Chick PC

(57) ABSTRACT

A film having an antistatic releasing agent layer comprising fiber-shaped carbon and disposed on at least one of the faces of a substrate film, a release film having a releasing agent layer disposed on one face of a substrate and an antistatic layer which comprises a cured product of a resin composition of the active energy ray curing type comprising fiber-shaped carbon or a combination of fiber-shaped carbon and an electrically conductive macromolecular compound and is disposed on the other face of the substrate film, and processes for producing the films. The release films have a relatively small thickness of the antistatic layer, exhibit the stable antistatic function, are excellent in smoothness, do not adversely affect hardening of the resin releasing agent, exhibit the excellent releasing function and provide the excellent productivity.

25 Claims, No Drawings

RELEASE FILM AND PROCESS FOR PRODUCING THE FILM

TECHNICAL FIELD

The present invention relates to a release film and a process for producing the film. More particularly, the present invention relates to a release film comprising an antistatic layer comprising fiber-shaped carbon and disposed on at least one of the faces of a substrate film. Still more particularly, the present invention relates to a release film comprising an antistatic releasing agent layer which comprises fiber-shaped carbon, disposed on one of the faces of a substrate film, exhibits the stable antistatic function, is excellent in smoothness and provides the releasing function, a process for producing the film, a release film which has a releasing agent layer disposed on one face of a substrate and an antistatic layer comprising fiber-shaped carbon and disposed on the other face of the substrate film and exhibits the excellent antistatic function and releasing function, and a process for producing the film.

BACKGROUND ART

A release film is used as the process film for producing films by casting of resins such as polyurethane resins, polyacrylic resins and polyvinyl chloride resins, the process film for molding of green sheets for laminated ceramic condensers and the protective film for pressure sensitive adhesives in pressure sensitive adhesive products.

In the release film, in general, a layer composed of a releasing agent such as a silicone-based resin and a non-silicone-based resin, which is, for example, a compound having a long chain alkyl group or an olefin-based resin, is formed on the surface of a substrate film. When a release film obtained as described above is peeled off after being used for the above application, an undesirable phenomenon arises in that static electricity is formed at the time of peeling, and foreign substances are attached to the product.

To prevent the undesirable phenomenon, it is conducted that the release film is subjected to an antistatic treatment.

For the antistatic treatment of a release film, in general, ionic compounds such as quaternary ammonium chloride have been used frequently. However, when the ionic compound is used for an antistatic layer, the antistatic property is greatly affected by the humidity of the atmosphere. When the ionic compound is contained in a releasing agent layer which uses silicone resin of the addition reaction type, there is the possibility that curing of the resin is adversely affected.

A system in which an electrically conductive metal-based filler such as a metal or a metal oxide is dispersed into a resin is proposed (for example, refer to Patent Reference 1). In this case, the particle diameter is great, and there is the possibility that smoothness of the film is adversely affected. Moreover, the antistatic property is unstable since uniform dispersion of the metal-based filler in the resin is difficult. A great amount of the filler must be added to exhibit the stable antistatic property, and the cost is inevitably increased. When the antistatic property is stabilized by increasing the amount of coating, there is the possibility that blocking takes place due to the increase in the thickness of the resin layer.

To overcome the above problems, a release film having the antistatic property in which, for example, an antistatic layer obtained by photo-curing a coating material of the photo-curing type composed of an electrically conductive macro-molecule, a photo-initiator and a binder is formed on the surface of a substrate film, and a releasing layer composed of a silicone resin of the addition type is formed on the antistatic layer, is disclosed (for example, refer to Patent Reference 2).

The above release film is a film suppressing adverse effects on the curing and exhibiting the excellent releasing function and antistatic function by forming a releasing layer composed of a silicone resin of the addition type on the surface of the antistatic layer containing the electrically conductive macro-molecule. However, the release film is not always satisfactory with respect to the productivity since the operations of forming the antistatic layer on the surface of the substrate film and forming the releasing layer on the formed antistatic layer are necessary.

[Patent Reference 1] Japanese Patent Application Laid-Open No. 2002-179954.

[Patent Reference 2] Japanese Patent Application Laid-Open No. 2005-153250.

DISCLOSURE OF THE INVENTION

Under the above circumstances, the present invention has an object of providing a release film which has a relatively small thickness of the antistatic layer, exhibits a stable antistatic function, is excellent in smoothness, does not adversely affect hardening of the resin releasing agent, exhibits excellent releasing function and provides excellent productivity.

As the result of intensive studies by the present inventors to develop the release film having the above desirable properties, it was found that the object could be achieved with a film having an antistatic releasing agent layer comprising fiber-shaped carbon and disposed on at least one of the faces of a substrate film as the first embodiment and with a release film having a releasing agent layer disposed on one of the faces of a substrate and an antistatic layer which comprises a cured product of a resin composition of the active energy ray curing type comprising fiber-shaped carbon or a combination of fiber-shaped carbon and an electrically conductive macromolecular compound and is disposed on the other face of the substrate film as the second embodiment. The present invention has been completed based on the knowledge.

The present invention provides:

(1) A release film which comprises an antistatic layer comprising fiber-shaped carbon and disposed on at least one of faces of a substrate film;

(2) The release film described in (1), wherein the antistatic layer comprising fiber-shaped carbon is an antistatic releasing agent layer comprising fiber-shaped carbon and a releasing agent;

(3) The release film described in (2), wherein the releasing agent is a silicone-based releasing agent;

(4) The release film described in (2), wherein the releasing agent is an agent selected from releasing agents based on a compound having a long chain alkyl group, alkyd resin-based releasing agents, olefin resin-based releasing agents, rubber-based releasing agents and acrylic releasing agents;

(5) The release film described in any one of (2) to (3), wherein a content of the fiber-shaped carbon in the antistatic layer is 0.1 to 30% by mass;

(6) The release film described in any one of (2) to (5), wherein a surface resistivity of the antistatic layer is $10^{12}\,\Omega/\square$ or smaller;

(7) The release film described in any one of (2) to (6), wherein a thickness of the antistatic layer is 0.01 to 3 μm;

(8) A process for producing a release film which comprises coating at least one of faces of a substrate film with a coating fluid comprising a releasing agent and fiber-shaped carbon and drying a formed coating layer to form an antistatic releasing agent layer;

(9) The release film described in (1), wherein the antistatic layer comprising fiber-shaped carbon comprises a cured product of a resin composition of an active energy ray curing type comprising fiber-shaped carbon, and a releasing agent layer is disposed on a face of the substrate film opposite to the face having the antistatic layer;

(10) The release film described in (9), wherein the resin composition of an active energy ray curing type further comprises an electrically conductive macromolecular compound;

(11). The release film described in (10), wherein the electrically conductive macromolecular compound is at least one compound selected from polyacetylene-based compounds, polythiophene-based compounds, polyaniline-based compounds, polypyrrol-based compounds, poly(phenylenevinylene)-based compounds, poly(vinylene sulfide)-based compounds, poly(p-phenylene sulfide)-based compounds and poly(thienylenevinylene)-based compounds;

(12) The release film described in any one of (9) to (11), wherein a content of the fiber-shaped carbon in the cured product is 0.1 to 30% by mass;

(13) The release film described in any one of (10) to (12), wherein a content of the electrically conductive macromolecular compound in the cured product is 0.01 to 10% by mass;

(14) The release film described in any one of (9) to (13), wherein a surface resistivity of the antistatic layer is $10^{13}\Omega/\square$ or smaller;

(15) The release film described in any one of (9) to (14), wherein a thickness of the antistatic layer is 0.01 to 3 μm;

(16) The release film described in any one of (9) to (15), wherein a releasing agent constituting the releasing agent layer is a silicone-based releasing agent;

(17) The release film described in any one of (9) to (15), wherein a releasing agent constituting the releasing agent layer is an agent selected from releasing agents based on a compound having a long chain alkyl group, alkyd resin-based releasing agents, olefin resin-based releasing agents, rubber-based releasing agents and acrylic releasing agents;

(18) The release film described in any one of (9) to (17), wherein a thickness of the releasing agent layer is 0.01 to 3 μm; and

(19) A process for producing a release film which comprises forming an antistatic layer on one of faces of a substrate film by coating the face with a resin composition of an active energy ray curing type comprising fiber-shaped carbon, drying a formed layer to form a coating film and irradiating the formed coating film with an active energy ray to cure the coating film, and forming a releasing agent layer on an other face of the substrate film by coating the other face with a coating fluid comprising a releasing agent and drying a formed layer.

To summarize the advantages of the present invention, in accordance with the present invention, a release film comprising an antistatic layer having a relatively small thickness which exhibits a stable antistatic function, is excellent in smoothness, does not adversely affect hardening of the resin releasing agent, exhibits excellent releasing function and provides excellent productivity, are provided.

The Most Preferred Embodiment to Carry Out the Invention

The release film as the first embodiment of the present invention is a release film which comprises an antistatic releasing agent layer comprising fiber-shaped carbon and disposed on at least one of the faces of a substrate film.

The substrate film used in the release film as the first embodiment of the present invention is not particularly limited and can be suitably selected from substrate films conventionally used as the substrate film of release films in accordance with the application of the release film. Examples of the substrate film include films of polyesters such as polyethylene terephthalate, polybutylene terephthalate and polyethylene naphthalate, polyethylene films, polypropylene films, polyvinyl chloride films, polyvinylidene chloride films, polyvinyl alcohol films, ethylene-vinyl acetate copolymer films, polystyrene films, polycarbonate films, polymethylpentene films, polysulfone films, polyether ether ketone films, polyether sulfone films, polyphenylene sulfide films, polyether imide films, polyimide films, fluororesin films, polyamide films, acrylic resin films, norbornene-based resin films and cycloolefin resin films.

The thickness of the substrate film is not particularly limited and suitably selected in accordance with the application. In general, the thickness is 10 to 150 μm and preferably 20 to 120 μm.

Where desired, the substrate film may be subjected to a surface treatment such as the oxidation treatment and the roughening treatment or the primer treatment on one or both faces so that adhesion with the antistatic releasing agent layer formed on the substrate film is improved. Examples of the oxidation treatment include the treatment by corona discharge, the treatment by plasma discharge, the treatment with chromic acid (a wet process), the treatment with flame, the treatment with the heated air and the treatment with ozone under irradiation with ultraviolet light. Examples of the roughening treatment include the sandblasting treatment and the treatment with a solvent. The surface treatment is suitably selected in accordance with the type of the substrate film. In general, the treatment by corona discharge is preferable from the standpoint of the effect and the operability.

In the first embodiment of the present invention, an antistatic releasing agent layer comprising fiber-shaped carbon is formed on at least one of the faces of the substrate film. As the releasing agent constituting the antistatic releasing agent layer, a silicone-based releasing agent or a non-silicone-based releasing agent is used. The releasing agent is suitably selected in accordance with the application of the release film.

As the silicone-based releasing agent, silicone-based releasing agents of the addition reaction type are preferable. The silicone-based releasing agent of the addition reaction type is obtained by adding crosslinking agents and catalysts to the main component comprising a silicone resin of the addition reaction type. Where desired, addition reaction suppressors, agents for release adjustment and adhesion improvers may be added. When irradiation with ultraviolet light is conducted in addition to heating in the curing process after the coating with the releasing agent, photo-initiators may be added.

The type of the silicone-based releasing agent may be any of the solvent type, the emulsion type and the non-solvent type as long as the releasing agent is the releasing agent of the addition reaction type. The releasing agents of the solvent type is preferable from the standpoint of the quality and the easiness of handling.

The silicone-based releasing agent of the addition reaction type is not particularly limited and can be suitably selected from releasing agents conventionally used as the silicone resin releasing agent of the thermosetting addition reaction type. For example, at least one releasing agent selected from polyorganosiloxanes having an alkenyl group in the molecule as the functional group can be used. Examples of the polyorganosiloxanes having an alkenyl group in the molecule as the functional group include polydimethylsiloxane having vinyl group as the functional group, polydimethylsiloxane having hexenyl group as the functional group and mixtures of these compounds.

Examples of the crosslinking agent include polyorganosiloxanes having at least two hydrogen atoms bonded with silicon atom in one molecule such as dimethylsiloxane-methylhydrogensiloxane copolymers having chain ends sealed with dimethylhydrogensiloxy group, dimethyl-siloxane-methylhydrogensiloxane copolymers having chain ends sealed with trimethylsiloxy group, poly(methylhydrogensiloxanes) having chain ends sealed with trimethylsiloxy group and poly(hydrogensilsesquioxane). The amount of the crosslinking agent is selected, in general, in the range of 0.1 to 100 parts by mass and preferably in the range of 0.3 to 50 parts by mass based on 100 parts by mass of the silicone resin of the addition reaction type.

As the catalyst, in general, platinum-based catalysts are used. Examples of the platinum-based catalyst include fine particulate platinum, fine particulate platinum adsorbed with a support of carbon powder, platinic acid chloride, platinic acid chloride modified with an alcohol, olefin complex compounds of platinic acid chloride, palladium and rhodium catalysts. The amount of the catalyst is about 1 to 1,000 ppm as the amount of the platinum-based metal based on the total of the amounts of the silicone resin of the addition reaction type and the crosslinking agents.

Examples of the agent for release adjustment include polyorganosiloxanes having no alkenyl group or hydrogen atom bonded with silicon atom in the molecule, specific examples of which include silicone resins such as polydimethylsiloxane having chain ends sealed with trimethylsiloxy group and polydimethylsiloxane having chain ends sealed with dimethylphenylsiloxy group.

The addition reaction suppressor is a component used for providing the composition with the storage stability at the room temperature. Examples of the addition reaction suppressor include 3,5-dimethyl-1-hexyn-3-ol, 3-methyl-1-penten-3-ol, 3-methyl-3-penten-1-yne, 3,5-di-methyl-3-hexen-1-yne, cyclic compounds derived from tetravinylsiloxane and benzotriazole.

Examples of the adhesion improver include vinyltriacetoxysilane, vinyltriethoxysilane, 3-glycidoxypropyltrimethoxysilane, 3-glycidoxy-propyltriethoxysilane and 3-methacryloxypropyltrimethoxysilane.

The photo-initiator is not particularly limited and can be suitably selected as desired from photo-initiators conventionally used for resins of the ultraviolet light curing type. Examples of the photo-initiator include benzoins, benzophenones, acetophenones, α-hydroxyketones, α-amino-ketones, α-diketones, α-diketone dialkyl acetals, anthraquinones, thio-xanthones and other like compounds.

The photo-initiator may be used singly or in combination of two or more. The amount is selected, in general, in the range of 0.01 to 30 parts by mass and preferably in the range of 0.05 to 20 parts by mass based on 100 parts by mass of the total of the amounts of the silicone resin of the addition reaction type and the crosslinking agent.

In the first embodiment of the present invention, for forming the antistatic releasing agent layer comprising fiber-shaped carbon which is constituted with the silicone-based releasing agent described above and fiber-shaped carbon on at least one of the faces of the substrate film, as the first step, a coating fluid of the silicone-based releasing agent of the solvent type comprising fiber-shaped carbon or a coating fluid of the silicone-based releasing agent of the emulsion type comprising fiber-shaped carbon is prepared.

In the coating fluid of the silicone-based releasing agent of the solvent type, in general, toluene, hexane, ethyl acetate, methyl ethyl ketone, heptane or a mixture of these solvents is used as the diluent. In the coating fluid of the silicone-based releasing agent of the emulsion type, in general, water is used as the diluent. The viscosity of the coating fluid is adjusted at a value allowing the coating operation.

Silica, antistatic agents, dyes, pigments and other additives may be added to the coating fluid of the silicone-based releasing agent, where necessary. The coating fluid of the silicone-based releasing agent thus prepared is applied to one of the faces of the substrate film, for example, in accordance with the gravure coating process, the bar coating process or the multi-roll coating process. As the amount of the coating, 0.01 to 3 $g/m^2$ is suitable, and 0.03 to 1 $g/m^2$ is preferable, as expressed as the amount of the solid components.

To cure the coating fluid coating the face of the substrate film, the coating fluid may be treated by heating in an oven of a coating machine or treated by irradiation with ultraviolet light after the heating. The irradiation after the heating is preferable from the standpoint of preventing formation of wrinkles due to heat shrinkage, the curing property of the silicone and adhesion of the releasing agent to the substrate film.

When the irradiation with ultraviolet light is used in combination, it is preferable that a releasing agent containing a photo-initiator is used or a photo-initiator is added when the coating fluid is prepared. As the photo-initiator added when the coating fluid is prepared, the photo-initiators described above as the photo-initiator added to the silicone-based releasing agent where necessary can be used.

When the curing is conducted by heating alone, it is suitable that the heating is conducted at a temperature in the range of about 70 to 160° C. for a time necessary for the sufficient curing. When the curing is conducted by the combination of the heating and the irradiation with ultraviolet light, the temperature of the heating can be lowered to a temperature of about 50 to 120° C.

For the irradiation with ultraviolet light, for example, a high voltage mercury lamp, a metal halide lamp, a high power metal halide lamp or an electrodeless discharge lamp can be used. The electrodeless discharge lamp is preferable due to the excellent curing property of the silicone-based releasing agent. The output of ultraviolet light can be suitably selected. It is preferable that the output of the ultraviolet light is 50 W/cm to 360 W/cm.

The thickness of the releasing agent layer comprising the silicone-based releasing agent and fiber-shaped carbon thus formed is, in general, about 0.01 to 3 μm and preferably 0.03 to 1 μm from the standpoint of the property of forming a uniform film, prevention of blocking, the releasing property and adhesion with the substrate film.

As the non-silicone-based releasing agent, conventional non-silicone-based releasing agents such as releasing agents based on compounds having a long chain alkyl group, alkyd resin-based releasing agents, olefin resin-based releasing agents, rubber-based releasing agents and acrylic resin-based releasing agents can be used.

As the above compound having a long chain alkyl group, conventional compounds having a long chain alkyl group such as polyvinyl carbamates obtained by bringing an alkyl isocyanate having a long chain alkyl group having 8 to 30 carbon atoms into reaction with a polyvinyl alcohol-based polymer and alkylurea derivatives obtained by bringing the above alkyl isocyanate having a long chain alkyl group into reaction with polyethyleneimine can be used. In the present invention, it is preferable that the compound having a long chain alkyl group obtained as described above has a melting point of 70° C. or higher from the standpoint of the stability of the releasing property of the formed releasing agent layer with time.

When the polyvinyl carbamate obtained by bringing an alkyl isocyanate having a long chain alkyl group into reaction with a polyvinyl alcohol-based polymer is used, the degree of saponification and the degree of polymerization of the polyvinyl alcohol-based polymer are not particularly limited. Completely saponified polymers are advantageous from the standpoint of handling. In general, polymers having a degree of polymerization of about 300 to 1,700 are used.

In the first embodiment of the present invention, the type of the coating fluid comprising the compound having a long chain alkyl group and the fiber-shaped carbon may be any of the solvent type and the emulsion type. A coating fluid of the aqueous emulsion type is preferable. Examples of the coating fluid of the aqueous emulsion type include coating fluids of the aqueous emulsion type obtained by the emulsifying treatment of the compound having a long chain alkyl group. The process for the emulsifying treatment is not particularly limited, and a conventional process can be used. For example, an aqueous emulsion can be obtained by emulsifying a solution of the compound having a long chain alkyl group in an organic solvent by stirring in an aqueous solution of a surfactant, followed by removing the organic solvent, where necessary. An aqueous emulation can also be obtained by dispersing the compound having a long chain alkyl group and a surfactant in the presence of water using a pressurized kneader or a colloid mill to form an emulsion.

The antistatic releasing agent layer can be formed by applying the coating fluid prepared by mixing fiber-shaped carbon with the aqueous emulsion obtained as described above using a conventional coating apparatus such as a roll coater, a gravure coater, a Mayer bar coater and a lip coater, followed by drying the formed coating layer.

As the condition of the drying, it is suitable that the drying is conducted by heating at a temperature in the range of about 80 to 160° C. for a time sufficient for the curing.

As the alkyd resin-based releasing agent described above, in general, an alkyd resin having a crosslinked structure is used.

For the formation of the layer of the alkyd resin having a crosslinked structure, a process in which a layer comprising a thermosetting resin composition comprising, for example, (X) an alkyd resin, (Y) a crosslinking agent and, where desired, (Z) a curing catalyst is heated and cured can be used.

The alkyd resin of component (X) is not particularly limited and a resin can be suitably selected from conventional alkyd resins. The alkyd resin is a resin obtained by condensation of a polyhydric alcohol and a polybasic acid and includes non-conversion alkyd resins which are resins modified with a condensation product of a dibasic acid and a dihydric alcohol or a fatty acid of a non-drying oil and conversion alkyd resins which are condensation products of a dibasic acid and an alcohol having a functionality of three or greater. Any of these alkyd resins can be used in the present invention.

Examples of the polyhydric alcohol used as the raw material for the alkyl resin include dihydric alcohols such as ethylene glycol, diethylene glycol, triethylene glycol, propylene glycol, trimethylene glycol, tetramethylene glycol and neopentyl glycol, trihydric alcohols such as glycerol, trimethylolethane and trimethylolpropane, and polyhydric alcohols having a functionality of four or greater such as diglycerol, triglycerol, pentaerythritol, dipentaerythritol, mannit and sorbit. The polyhydric alcohol may be used singly or in combination of two or more.

Examples of the polybasic acid include aromatic polybasic acids such as phthalic anhydride, terephthalic acid, isophthalic acid and trimellitic anhydride, aliphatic saturated polybasic acids such as succinic acid, adipic acid and sebacic acid, aliphatic unsaturated polybasic acids such as maleic acid, maleic anhydride, fumaric acid, itaconic acid and citraconic anhydride, and polybasic acids obtained by the Diels-Alder reaction such as addition products of cyclopentadiene and maleic anhydride, addition products of terpene and maleic anhydride and addition products of rosin and maleic acid. The polybasic acid may be used singly or in combination of two or more.

As the modifier, for example, octylic aid, lauric acid, palmitic acid, stearic acid, oleic acid, rinoleic acid, rinolenic acid, eleostearic acid, ricinoleic acid, dehydrated ricinoleic acid, coconut oil, linseed oil, tung oil, castor oil, dehydrated castor oil, soy bean oil, safflower oil and fatty acids derived from these oils can be used. The modifier may be used singly or in combination of two or more.

In the first embodiment of the present invention, the alkyd resin of component (X) may be used singly or in combination of two or more.

Examples of the crosslinking agent of component (Y) include amino resins such as melamine resins and urea resins, urethane resins, epoxy resins and phenol resins.

In the present invention, the crosslinking agent of component (Y) may be used singly or in combination of two or more.

In the thermosetting resin composition, it is preferable that the ratio of the amounts of component (X) to component (Y) described above is in the range of 70:30 to 10:90 expressed as the amounts by mass of the solid components. When the amount of component (X) exceeds the above range, the cured product is not provided with the sufficient crosslinked structure, and the peeling property may be decreased. When the amount of component (X) is smaller than the above range, the cured product becomes hard and fragile, and the releasing property deteriorates. It is preferable that the ratio of the amounts of component (X) to component (Y) is in the range of 65:35 to 10:90 and more preferably in the range of 60:40 to 20:80 expressed as the amounts by mass of the solid components.

In the thermosetting resin composition, an acidic catalyst can be used as the curing catalyst of component (Z). The acidic catalyst is not particularly limited and can be suitably selected from conventional acidic catalysts used as the catalyst for the crosslinking reaction of alkyd resins. As the acidic catalyst, for example, organic acidic catalysts such as p-toluenesulfonic acid and methanesulfonic acid are preferable. The acidic catalyst may be used singly or in combination of two or more. The amount of the acidic catalyst is selected, in general, in the range of 0.1 to 40 parts by mass, preferably in the range of 0.5 to 30 parts by mass and more preferably in the range of 1 to 20 parts by mass based on 100 parts by mass as the total of the amounts of component (X) and component (Y).

In the first embodiment of the present invention, the type of the coating fluid of the alkyd resin-based releasing agent comprising the thermosetting resin composition described above and fiber-shaped carbon may be any of the solution type and the emulsion type. A coating fluid of the solution type is preferable from the standpoint of the convenience in the use. Examples of the organic solvent used in the coating fluid of the solvent type include toluene, xylene, methanol, ethanol, isobutanol, n-butanol, acetone, methyl ethyl ketone and tetrahydrofuran. The organic solvent may be used singly or in combination of two or more.

Into the above organic solvent, fiber-shaped carbon, components (X) and (Y) described above and component (Z) and various additive components which are used where desired are added in respective specific amounts. The viscosity of the resultant solution is adjusted to a value allowing the coating operation, and the coating fluid of the alkyd resin-based releasing agent comprising fiber-shaped carbon can be obtained. The additive components used in this preparation is not particularly limited and can be suitably selected from conventional additive components used as the additive components for alkyd resins. For example, antistatic agents such as cationic surfactants, other resins such as acrylic resins for adjusting flexibility and viscosity, leveling agents, defoaming agents and coloring agents can be used.

The coating fluid of the alkyd resin-based releasing agent comprising fiber-shaped carbon obtained as described above is applied to one of the faces of the substrate film in accordance with a conventional process such as the bar coating process, the reverse roll coating process, the knife coating process, the roll knife coating process, the gravure coating process, the air doctor coating process and the doctor blade coating process. The antistatic releasing agent layer can be formed by curing the formed coating layer by heating at a temperature of about 80 to 150° C. for several tens seconds to several minutes.

As the olefin resin-based releasing agent described above, a crystalline olefin-based resin is used. As the crystalline olefin-based resin, polyethylene and crystalline polypropylene-based resins are preferable. Examples of the crystalline polypropylene-based resin include propylene homopolymers having the isotactic configuration or the syndiotactic configuration and propylene-α-olefin copolymers. Examples of the polyethylene include high density polyethylene, low density polyethylene and linear low density polyethylene. The crystalline olefin-based resin may be used singly or in combination of two or more.

In the first embodiment of the present invention, the antistatic releasing agent layer can be formed on at least one of the faces of the substrate film using a resin composition comprising the olefin resin-based releasing agent described above and fiber-shaped carbon in accordance with the extrusion lamination process.

As the rubber-based releasing agent, for example, substances shown in the following can be used.

Releasing agents using a rubber-based resin which is, for example, natural rubber-based resin or synthetic rubber-based resins such as butadiene rubber, isoprene rubber, styrene-butadiene rubber, methyl methacrylate-butadiene rubber and acrylonitrile-butadiene rubber, can be used.

In the first embodiment of the present invention, the coating fluid of the rubber-based releasing agent which comprises the rubber-based releasing agent and fiber-shaped carbon can be prepared by dissolving polybutadiene or polyisobutylene and components which are used where necessary such as photo-initiators, photo-sensitizers, antioxidants, plasticizers and stabilizers into an organic solvent. The antioxidant is not particularly limited and can be suitably selected from conventional phosphite-based antioxidants, organic sulfur-based antioxidants and hindered phenol-based antioxidants. The organic solvent can be selected from conventional organic solvents which exhibit excellent solubility to the components of the composition. By dissolving afore-said polybutadiene or polyisobutylene into an organic solvent and further dispersing a prescribed amount of the fiber-shaped carbon, the coating fluid of the rubber-based releasing agent which comprises the rubber-based releasing agent and fiber-shaped carbon can be obtained. The coating fluid of the rubber-based releasing agent which comprises fiber-shaped carbon is applied to one of the faces of the substrate film in accordance with a conventional process such as the bar coating process, the reverse roll coating process, the knife coating process, the roll knife coating process, the gravure coating process, the air doctor coating process and the doctor blade coating process. For curing the applied coating fluid, the coating fluid is treated for curing by heating at a temperature of about 80 to 150° C. for several tens seconds to several minutes or by irradiation with ultraviolet light after being heated. It is preferable that the layer is formed by irradiation of the layer formed by application of the coating fluid of the releasing agent with ultraviolet light since the formed releasing film can be peeled under a smaller force. It is preferable that the output of ultraviolet light is in the range of 1 to 50 mJ/m$^2$ and more preferably in the range of 2 to 45 mJ/cm$^2$.

As the acrylic releasing agent described above, in general, an acrylic resin having a crosslinked structure is used.

For forming the antistatic releasing agent comprising the releasing agent comprising an acrylic resin having a crosslinked structure and fiber-shaped carbon, for example, a layer comprising an acrylic resin composition comprising a (meth)acrylic ester-based copolymer having a crosslinking functional group, a crosslinking agent and fiber-shaped carbon is cured by heating.

Preferable example of the (meth)acrylic ester-based copolymer having a crosslinking functional group include copolymers of a (meth)acrylic ester in which the alkyl group in the ester portion has 1 to 20 carbon atoms, a monomer having a functional group having active hydrogen atom and other monomers which are used where desired.

Examples of the (meth)acrylic ester in which the alkyl group in the ester portion has 1 to 20 carbon atoms include methyl(meth)acrylate, ethyl(meth)acrylate, propyl(meth)acrylate, butyl(meth)acrylate, pentyl (meth)acrylate, hexyl (meth) acrylate, cyclohexyl(meth)acrylate, 2-ethylhexyl (meth)acrylate, isooctyl(meth)acrylate, decyl(meth)acrylate, dodecyl(meth)acrylate, myristyl(meth)acrylate, palmityl (meth)acrylate and stearyl(meth)acrylate. The above (meth) acrylates may be used singly or in combination of two or more.

In the entire descriptions of the present invention, "(meth) acrylic" means "acrylic" and "methacrylic", and "(meth) acrylate" means "acrylate" and "methacrylate".

Examples of the monomer having a functional group having active hydrogen atom include hydroxyalkyl esters of (meth)acrylic acid such as 2-hydroxyethyl(meth)acrylate, 2-hydroxypropyl(meth)acrylate, 3-hydroxypropyl(meth) acrylate, 2-hydroxybutyl(meth)acrylate, 3-hydroxybutyl (meth)acrylate and 4-hydroxybutyl(meth)acrylate; monoalkylaminoalkyl esters of (meth)acrylic acid such as monomethyl-aminoethyl (meth)acrylate, monoethylaminoethyl(meth)acrylate, monomethylaminopropyl(meth)acrylate and monoethylaminopropyl (meth)acrylate; and ethylenically unsaturated carboxylic acids such as acrylic acid, methacrylic acid, crotonic acid, maleic acid, itaconic acid and citraconic acid. The above monomer may be used singly or in combination of two or more.

Examples of the other monomer which is used where desired include vinyl esters such as vinyl acetate and vinyl propionate; olefins such as ethylene, propylene and isobutylene; halogenated olefins such as vinyl chloride and vinylidene chloride; styrene-based monomers such as styrene and α-methylstyrene; diene-based monomers such as butadiene, isoprene and chloroprene; nitrile-based monomers such as acrylonitrile and methacrylonitrile; and acrylamides such as acrylamide, N-methylacrylamide and N,N-dimethyl-acrylamide. The other monomer may be used singly or in combination of two or more.

In the acrylic resin composition, it is preferable that the (meth)acrylic ester-based copolymer has a weight-average molecular weight of 300,000 or greater. The (meth)acrylic ester-based copolymer may be used singly or in combination of two or more.

The crosslinking agent in the acrylic resin composition is not particularly limited and can be suitably selected from crosslinking agents conventionally used as the crosslinking agent in acrylic resins. Examples of the crosslinking agent include amino resins such as melamine resins and urea resins, epoxy resins, dialdehydes, methylol polymers, aziridine-based compounds, metal chelate compounds, metal alkoxides and metal salts. Amino resins such as melamine resins and urea resins are preferable. The crosslinking agent may be used singly or in combination of two or more. The amount is selected, in general, in the range of 0.01 to 20 parts by mass and preferably in the range of 0.1 to 10 parts by mass based on 100 parts by mass of the (meth)acrylic ester-based copolymer.

To the acrylic resin composition, where desired, various additives such as antioxidants, ultraviolet light absorbents, photo-stabilizers, softeners, fillers and coloring agents may be added as long as the object of the present invention is not adversely affected.

The type of the coating fluid comprising the acrylic resin composition and fiber-shaped carbon may be any of the solution type and the emulsion type. A coating fluid of the solution type is preferable from the standpoint of the convenience in the use. Examples of the organic solvent used in the coating fluid of the solvent type include toluene, xylene, methanol, ethanol, isobutanol, n-butanol, acetone, methyl ethyl ketone and tetrahydrofuran. The organic solvent may be used singly or in combination of two or more.

The coating fluid comprising the acrylic resin composition comprising fiber-shaped carbon can be obtained by dissolving the acrylic resin composition described above into the organic solvent, followed by dispersing a specific amount of fiber-shaped carbon into the obtained solution.

The coating fluid comprising the acrylic resin composition comprising fiber-shaped carbon obtained as described above is applied on one of the faces of the substrate film in accordance with a conventional process such as the bar coating process, the reverse roll coating process, the knife coating process, the roll knife coating process, the gravure coating process, the air doctor coating process and the doctor blade coating process. The antistatic releasing agent layer comprising the acrylic resin-based releasing agent and fiber-shaped carbon can be formed by curing the formed coating layer by heating at a temperature of about 80 to 150° C. for several tens seconds to several minutes.

In release film of the first embodiment of the present invention, the thickness of the antistatic releasing agent layer comprising the non-silicone-based releasing agent and fiber-shaped carbon formed on at least one of the faces of the substrate film as described above is, in general, about 0.01 to 3 μm and preferably 0.03 to 1 μm from the standpoint of the property of forming the uniform film, the property of preventing blocking, the releasing property and adhesion with the substrate film.

In the first embodiment of the present invention, as the fiber-shaped carbon comprised in the antistatic releasing agent layer, carbon nano tubes which are cylindrical hollow fiber-shaped materials having an average outer diameter of about 0.5 to 120 nm and an average length of about 50 nm or greater are preferable. When the average outer diameter is smaller than 0.5 nm, dispersion is difficult, and it is difficult that the electric conductivity is sufficiently exhibited. When the average outer diameter exceeds 120 nm, smoothness decreases, and there is the possibility that the electric conductivity decreases. When the length is smaller than 50 nm, the electric conductivity tends to decrease. When the length is excessively great, the property for dispersion becomes poor. It is preferable that the average outer diameter is 1 to 100 nm and the length is 0.1 to 15 μm.

As the fiber-shaped carbon, carbon nano fibers may be used. It is known that there are three types of carbon nano fibers, i.e., the types in which the orientation of the face of carbon net relative to the fiber axis is parallel (the ribbon type), perpendicular (the platelet type) and inclined (herringbone type).

From the standpoint of the antistatic property of the antistatic releasing agent layer, it is preferable that the content of amorphous carbon particles contained in the carbon nano tubes as impurities is 20% by mass or smaller.

The carbon nano tube used in the present invention has a shape formed by winding a single sheet of graphite into a cylindrical shape and may be any of the single layer carbon nano tube having the sheet of graphite wound to form a single layer and the multi-layer carbon nano tube having the sheet of graphite wound to form a plurality of layers. The multi-layer carbon nano tube is preferable since the affinity with the resin and the properties of the carbon nano tube itself are simultaneously exhibited more easily. A surface treatment such as oxidation is necessary to provide the carbon nano tube with the affinity with the resin. Since the single layer carbon nano tube has just a single layer of graphite, it frequently occurs that the crystalline arrangement in the graphite layer is disturbed by the surface treatment, and the excellent electric conductivity and mechanical properties of carbon nano tube are lost. From the above standpoint, the multi-layer carbon nano tube having a plurality of layers of graphite is preferable.

The carbon nano tube used in the first embodiment of the present invention can be prepared in accordance with the catalytic chemical vapor deposition process (the CCVD process) in which an iron-based catalyst or a cobalt-based catalyst is introduced into pores of zeolite, the chemical vapor deposition process (the CVD process), the laser abrasion process or the arc discharge process using a carbon rod or carbon fiber.

It is not necessary that the end portion of the carbon nano tube has a cylindrical shape but may have a modified shape such as a cone shape. The carbon nano tube may have a structure having an open end portion or a closed end potion. The structure having an open end portion is preferable. The structure of the carbon nano tube having a closed end portion can be converted into the structure having an open end portion by a chemical treatment such as the treatment with nitric acid.

In the first embodiment of the present invention, it is preferable that the content of the fiber-shaped carbon in the antistatic releasing agent layer is 0.1 to 30% by mass and more preferably 0.5 to 15% by mass. When the content of the fiber-shaped carbon in the antistatic releasing agent layer is smaller than 0.1% by mass, there is the possibility that the antistatic property is insufficient. When the content of the fiber-shaped carbon in the antistatic releasing agent layer exceeds 30% by mass, dispersion of the fiber-shaped carbon becomes poor, and the antistatic property tends to become poor.

It is preferable that the surface resistivity of the antistatic layer is $10^{12}\Omega/\square$ or smaller and more preferably $10^{10}\Omega/\square$ or smaller. This condition is satisfied when the content of the fiber-shaped carbon in the antistatic releasing agent layer is within the above range.

The present invention also provides a process for producing a release film which comprises coating at least one of faces of a substrate film with a coating fluid comprising a releasing agent and fiber-shaped carbon and drying the formed coating layer to form an antistatic releasing agent layer.

In the release film as the first embodiment of the present invention, the antistatic releasing agent layer is disposed on at least one of the faces of the substrate film, exhibits stable antistatic function, is excellent in smoothness and has the excellent releasing function. The release film is advantageously used, for example, for the process film for producing films by casting of resins such as polyurethane resins, polyacrylic resins and polyvinyl chloride resins, the process film for molding of green sheets for laminated ceramic condensers and the protective film for pressure sensitive adhesives in pressure sensitive adhesive products.

The release film as the second embodiment of the present invention is a release film comprising a releasing agent layer on one of the faces of the substrate film and an antistatic layer comprising fiber-shaped carbon on the other face.

The substrate used for the release film as the second embodiment of the present invention is not particularly limited. The substrate film used for the release film as the first embodiment of the present invention can be used. The thickness of the substrate film is the same as the thickness of the release film as the first embodiment of the present invention. Where desired, the substrate film may be subjected to a surface treatment such as the oxidation treatment and the roughening treatment or the primer treatment on one or both faces in accordance with the process disclosed for the treatment of the substrate film in the release film as the first embodiment of the present invention so that adhesion with the releasing agent layer and the antistatic layer to be formed on the surfaces of the substrate is improved.

In the second embodiment of the present invention, the releasing agent layer is formed on one of the faces of the substrate film. As the releasing agent constituting the releasing agent layer, a silicone-based releasing agent or a non-silicone-based releasing agent is used similarly to the releasing agent layer used for the formation of the antistatic releasing agent layer comprising the fiber-shaped carbon in the first embodiment of the present invention. The releasing agent can be suitably selected in accordance with the application of the release film. The releasing agents disclosed as the agents which can be used for the antistatic releasing agent layer in the first embodiment of the present invention can be used.

In the second embodiment of the present invention, for forming the releasing agent layer constituted with the silicone-based releasing agent described above on one face of the substrate film, a coating fluid of the silicone-based releasing agent of the solvent type or a coating fluid of the silicone-based releasing agent of the emulsion type is prepared.

In the coating fluid of the silicone-based releasing agent of the solvent type, in general, toluene, hexane, ethyl acetate, methyl ethyl ketone, heptane or a mixture of these solvents are used as the diluent. In the coating fluid of the releasing agent of the emulsion type, in general, water is used as the diluent. The viscosity of the coating fluid is adjusted at a value allowing the coating operation.

Silica, antistatic agents, dyes, pigments and other additives may be added to the coating fluid of the silicone-based releasing agent, where necessary. The coating fluid of the silicone-based releasing agent thus prepared is applied to one face of the substrate film, for example, in accordance with the gravure coating process, the bar coating process or the multi-roll coating process. As the amount of the coating, 0.01 to 3 g/m$^2$ is suitable, and 0.03 to 1 g/m$^2$ is preferable, as expressed as the amount of the solid components.

To cure the coating fluid coating the face of the substrate film, the coating fluid may be treated by heating in an oven of a coating machine or treated by irradiation with ultraviolet light after the heating. The irradiation after the heating is preferable from the standpoint of preventing formation of wrinkles due to heat shrinkage, the curing property of the silicone and adhesion of the releasing agent to the substrate film.

When the irradiation with ultraviolet light is used in combination, it is preferable that a releasing agent containing a photo-initiator is used or a photo-initiator is added when the coating fluid is prepared. As the photo-initiator added when the coating fluid is prepared, the photo-initiators described above as the photo-initiator added to the silicone-based releasing agent where necessary can be used.

When the curing is conducted by heating alone, it is suitable that the heating is conducted at a temperature in the range of about 70 to 160° C. for a time necessary for the sufficient curing. When the curing is conducted by the combination of the heating and the irradiation with ultraviolet light, the temperature of the heating can be lowered to a temperature of about 50 to 120° C.

For the irradiation with ultraviolet light, for example, a high voltage mercury lamp, a metal halide lamp, a high power metal halide lamp or an electrodeless discharge lamp can be used. The electrodeless discharge lamp is preferable due to the excellent curing property of the silicone-based releasing agent. The output of ultraviolet light can be suitably selected. It is preferable that the output of the ultraviolet light is 50 W/cm to 360 W/cm.

The thickness of the silicone-based releasing agent layer thus formed is, in general, about 0.01 to 3 μm and preferably 0.03 to 1 μm.

In the second embodiment of the present invention, the type of the coating fluid comprising the compound having a long chain alkyl group among the non-silicone-based releasing agents may be any of the solvent type and the emulsion type. A coating fluid of the aqueous emulsion type is preferable. Examples of the coating fluid of the aqueous emulsion type include coating fluids of the aqueous emulsion type obtained by the emulsifying treatment of the compound having a long chain alkyl group as described above. The process for the emulsifying treatment is not particularly limited, and a conventional process can be used. For example, an aqueous emulsion can be obtained by emulsifying a solution of the compound having a long chain alkyl group in an organic solvent by stirring in an aqueous solution of a surfactant, followed by removing the organic solvent, where necessary. An aqueous emulation can be obtained also by dispersing the compound having a long chain alkyl group and a surfactant in the presence of water using a pressurized kneader or a colloid mill to form an emulsion.

The releasing agent layer can be formed by applying a coating fluid prepared by mixing fiber-shaped carbon with the aqueous emulsion obtained as described above using a conventional coating apparatus such as a roll coater, a gravure coater, a Mayer bar coater and a lip coater, followed by drying the formed coating layer.

As for the condition of the drying, it is suitable that the drying is conducted by heating at a temperature in the range of about 80 to 160° C. for a time sufficient for the curing.

In the second embodiment of the present invention, when an alkyd resin-based releasing agent and, in particular, a releasing agent based on an alkyd resin having a crosslinked structure is used as the releasing agent among the non-silicone-based releasing agents, the type of the coating fluid of the alkyd resin-based releasing agent comprising the thermosetting resin composition described above comprising (X) the alkyd resin, (Y) the crosslinking agent and (Z) the curing catalyst which is used where desired may be any of the solution type and the emulsion type. A coating fluid of the solution type is preferable from the standpoint of the convenience in the use. Examples of the organic solvent used in the coating fluid of the solvent type include toluene, xylene, methanol, ethanol, isobutanol, n-butanol, acetone, methyl ethyl ketone and tetrahydrofuran. The organic solvent may be used singly or in combination of two or more.

Into the above organic solvent, fiber-shaped carbon, components (X) and (Y) described above and component (Z) and various additive components which are used where desired are added in respective specific amounts. The viscosity of the resultant solution is adjusted to a value allowing the coating operation, and the coating fluid of the alkyd resin-based releasing agent can be obtained. The additive components used in this preparation is not particularly limited and can be suitably selected from conventional additive components used as the additive components for alkyd resins. For example, antistatic agents such as cationic surfactants, other resins such as acrylic resins for adjusting flexibility and viscosity, leveling agents, defoaming agents and coloring agents can be used.

The coating fluid of the alkyd resin-based releasing agent obtained as described above is applied to one of the faces of the substrate film in accordance with a conventional process such as the bar coating process, the reverse roll coating process, the knife coating process, the roll knife coating process, the gravure coating process, the air doctor coating process and the doctor blade coating process. The antistatic releasing agent layer can be formed by curing the formed coating layer by heating at a temperature of about 80 to 150° C. for several tens seconds to several minutes.

In the second embodiment of the present invention, when the olefin resin-based releasing agent described above is used, in general, the releasing agent layer can be formed on one of the faces of the substrate film, in general, using the extrusion lamination process.

In the second embodiment of the present invention, when the rubber-based releasing agent among the non-silicone-based releasing agents is used as the releasing agent, the coating fluid of the rubber-based releasing agent comprising the rubber-based releasing agent is prepared by dissolving polybutadiene or polyisobutylene and components which are used where necessary such as photo-initiators, photo-sensitizers, antioxidants, plasticizers and stabilizers into an organic solvent. The antioxidant is not particularly limited and can be suitably selected from conventional phosphite-based antioxidants, organic sulfur-based antioxidants and hindered phenol-based antioxidants. The organic solvent can be selected from conventional organic solvents which exhibit excellent solubility to the components of the composition. The coating fluid of the rubber-based releasing agent prepared as described above is applied to one of the faces of the substrate film in accordance with a conventional process such as the bar coating process, the reverse roll coating process, the knife coating process, the roll knife coating process, the gravure coating process, the air doctor coating process and the doctor blade coating process. The releasing agent layer can be formed by heating the formed coating layer at a temperature of about 80 to 150° C. for several tens seconds to several minutes or by irradiation of a ultraviolet light after the releasing agent layer is formed by heating. It is preferable that the releasing agent layer is formed by irradiating the layer formed by application of the coating fluid of the releasing agent with ultraviolet light since the formed releasing film can be peeled under a smaller force. It is preferable that the output of ultraviolet light is in the range of 1 to 50 mJ/cm$^2$ and more preferably in the range of 2 to 45 mJ/cm$^2$.

In the second embodiment of the present invention, when the acrylic releasing agent and, in particular, the acrylic releasing agent using the acrylic resin having a crosslinked structure among the non-silicone-based releasing agents is used as the releasing agent, the coating fluid of the acrylic resin composition described above is applied to one of the faces of the substrate film in accordance with a conventional process such as the bar coating process, the reverse roll coating process, the knife coating process, the roll knife coating process, the gravure coating process, the air doctor coating process and the doctor blade coating process. The acrylic releasing agent layer can be formed by curing the formed coating layer by heating at a temperature of about 80 to 150° C. for several tens seconds to several minutes.

In release film of the second embodiment of the present invention, the thickness of the non-silicone-based releasing agent layer formed on at least one of the faces of the substrate film as described above is, in general, about 0.01 to 3 μm and preferably 0.03 to 1 μm.

In the second embodiment of the present invention, the antistatic layer which is formed on the face of the substrate film opposite to the face having the releasing agent layer is a layer comprising a cured product of a resin composition of the active energy ray curing type comprising the fiber-shaped carbon and, where necessary, an electrically conductive macromolecule.

In the resin composition of the active energy ray curing type, a monomer and/or an oligomer polymerizable with active energy ray, which has two or more polymerizable unsaturated groups in the molecule, can be used as the polymerizable compound of the active energy ray curing type.

The polymerizable compound of the active energy ray curing type means a polymerizable compound which is crosslinked and cured by irradiation with a ray having an energy quantum among electromagnetic waves and particle rays, i.e., ultraviolet light or electron beams.

When the active energy ray is active light such as ultraviolet light, in general, a photopolymerization initiator is used in combination with the monomer and/or the oligomer polymerizable with active energy ray. When the active energy ray is electron beams, it is not necessary that a photopolymerization initiator is used. In the present invention, it is preferable that active light such as ultraviolet light is used as the active energy ray. Therefore, it is preferable that the resin composition of the active energy ray curing type is a resin composition of the photo-curing type which comprises (A) a monomer and/or an oligomer polymerizable with active energy ray which has two or more polymerizable unsaturated groups in the molecule and (B) a photopolymerization initiator.

Examples of the monomer polymerizable with active energy ray which has two or more polymerizable unsaturated groups in the molecule and is used as component (A) include polyfunctional acrylates such as 1,4-butanediol di(meth)acrylate, 1,6-hexanediol di(meth)acrylate, neopentyl glycol di(meth)acrylate, polyethylene glycol di(meth)acrylate, neopentyl glycol adipate di(meth)acrylate, neopentyl glycol di(meth)acrylate hydroxypivalate, dicyclopentanyl di(meth)acrylate, dicyclopentenyl di(meth)acrylate modified with caprolactone, di(meth)acrylate of phosphoric acid modified with ethylene oxide, cyclohexyl di(meth)acrylate substituted with allyl group, isocyanurate di(meth)acrylate, trimethylolpropane tri(meth)acrylate, dipentaerythritol tri(meth)acrylate, dipentaerythritol tri(meth)acrylate modified with propionic acid, pentaerythritol tri(meth)acrylate, trimethylolpropane tri(meth)acrylate modified with propylene oxide, tris(acryloxyethyl)isocyanurate, dipentaerythritol penta(meth)acrylate modified with propionic acid, dipentaerythritol hexa(meth)acrylate and dipenta-erythritol hexa(meth)acrylate modified with caprolactone. The above the monomer polymerizable with active energy ray may be used singly or in combination of two or more.

The oligomer polymerizable with active energy ray includes oligomers of the radical polymerization type and oligomers of the cationic polymerization type. Examples of the oligomer of the radical polymerization type include polyester acrylate-based oligomers, epoxy acrylate-based oligomers, urethane acrylate-based oligomers and polyol acrylate-based oligomers.

The polyester acrylate-based oligomer can be obtained, for example, by obtaining a polyester oligomer having hydroxyl groups at both ends by condensation of a polybasic carboxylic acid with a polyhydric alcohol, followed by esterification of the hydroxyl groups in the obtained oligomer with (meth)acrylic acid; or by obtaining an oligomer having hydroxyl groups at both ends by addition of an alkylene oxide to a polybasic carboxylic acid, followed by esterification of the hydroxyl groups of the obtained oligomer with (meth)acrylic acid. The epoxy acrylate-based oligomer can be obtained, for example, by esterification of oxirane rings in an epoxy resin of a bisphenol type or a novolak type having a relatively low molecular weight by the reaction with (meth)acrylic acid. The urethane acrylate-based oligomer can be obtained, for example, by obtaining a polyurethane oligomer by the reaction of a polyether polyol or a polyester polyol with a polyisocyanate, followed by esterification of the obtained oligomer with (meth)acrylic acid. The polyol acrylate-based oligomer can be obtained, for example, by esterification of hydroxyl groups in a polyether polyol with (meth)acrylic acid. The above oligomers polymerizable with active energy ray may be used singly or in combination of two or more.

Examples of the oligomer polymerizable with active energy ray of the cationic polymerization type include epoxy resins, oxetane resins and vinyl ether resins. Examples of the epoxy resin include compounds obtained by epoxidation of polyhydric phenols such as bisphenol resins and novolak resins with epichlorohydrin and compounds obtained by oxidation of linear olefin compounds and cyclic olefin compounds with peroxides.

Examples of the photopolymerization initiator of component (B) for the photopolymerizable oligomers and the photopolymerizable monomers of the radical polymerization type among the oligomers and the monomers polymerizable with active energy ray include benzoin, benzoin methyl ether, benzoin ethyl ether, benzoin isopropyl ether, benzoin n-butyl ether, benzoin isobutyl ether, acetophenone, dimethylaminoacetophenone, 2,2-dimethoxy-2-phenylacetophenone, 2,2-diethoxy-2-phenylacetophenone, 2-hydroxy-2-methyl-1-phenylpropan-1-one, 1-hydroxycyclohexyl phenyl ketone, α-hydroxycyclohexylphenylmethanone, 2-methyl-1-[4-(methyl-thio)phenyl]-2-morpholinopropan-1-one, 4-(2-hydroxyethoxy)phenyl 2-(hydroxy-2-propyl)ketone, benzophenone, p-phenylbenzophenone, 4,4'-diethylaminobenzophenone, dichlorobenzophenone, 2-methyl-anthraquinone, 2-ethylanthraquinone, 2-tertiary-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyl dimethyl ketal, acetophenone dimethyl ketal and p-dimethylaminobenzoic acid esters. Examples of the photopolymerization initiator for the photopolymerizable oligomers of the cationic polymerization type include compounds composed of oniums such as aromatic sulfonium ions, aromatic oxosulfonium ions and aromatic iodonium ions and anions such as tetrafluoroborates, hexafluorophosphates, hexafluoroantimonates and hexafluoroarsenates. The above photopolymerization initiators may be used singly or in combination of two or more. The amount is, in general, selected in the range of 0.2 to 10 parts by weight per 100 parts by weight of the photopolymerizable monomer and/or the photopolymerizable oligomer.

In the second embodiment of the present invention, fiber-shaped carbons having the same characteristics as those of the fiber-shaped carbon comprised in the antistatic releasing agent layer as the first embodiment of the present invention can be used as the fiber-shaped carbon comprised in the resin composition of the active energy ray curing type.

In the second embodiment of the present invention, the carbon nano tube is added to and dispersed in the resin composition of the active energy ray curing type in an amount such that the content of the nano tube in the formed antistatic layer is preferably 0.1 to 30% by mass and more preferably 0.3 to 10% by mass. When the content of the fiber-shaped carbon in the antistatic layer is smaller than 0.1% by mass, there is the possibility that the antistatic property is insufficient. When the content of the fiber-shaped carbon exceeds 30% by mass, dispersion of the fiber-shaped carbon becomes poor, and the antistatic property tends to become poor.

The electrically conductive macromolecular compound comprised in the resin composition of the active energy ray curing type where necessary is not particularly limited and can be suitably selected from conventional electrically conductive macromolecular compounds. Examples of the electrically conductive macromolecular compound include polyacetylene-based macromolecular compounds such as polyacetylene having the trans-configuration, polyacetylene having the cis-configuration and polydiacetylene; poly(phenylene)-based macromolecular compounds such as poly(p-phenylene) and poly(m-phenylene); polythiophene-based macromolecular compounds such as polythiophene, poly(3-alkylthiophene), poly(3-thiophene-β-ethanesulfonic acid) and mixtures of polyalkylene-dioxythiophene and polystyrenesulfonate; polyaniline-based macromolecular compounds such as polyaniline, polymethylaniline and polymethoxyaniline; polypyrrol-based macromolecular compounds such as polypyrrol, poly(3-methylpyrrol) and poly(3-octylpyrrol); poly(phenylene-vinylene)-based macromolecular compounds such as poly(p-phenylene-vinylene); poly(vinylene sulfide)-based macromolecular compounds; poly(p-phenylene sulfide)-based macromolecular compounds; and poly(thienylenevinylene)-based macromolecular compounds. Among these macromolecular compounds, polyacetylene-based macromolecular compounds, polythiophene-based macromolecular compounds, polyaniline-based macromolecular compounds, polypyrrol-based macromolecular compounds and poly(phenylenevinylene)-based macromolecular compounds are preferable from the standpoint of the properties and the availability.

In the second embodiment of the present invention, the electrically conductive macromolecular compound may be used singly or in combination of two or more. From the standpoint of the effect of improving the antistatic property and the dispersion, the electrically conductive macromolecular compound is added to the resin composition of the active energy ray curing type in an amount such that the content of the electrically conductive macromolecular compound in the formed antistatic layer is, in general, 0.01 to 10% by mass, preferably 0.01 to 5% by mass and more preferably 0.1 to 3% by mass.

The resin composition of the active energy ray curing type, preferably the resin composition of the photo-curing type, used in the second embodiment of the present invention can be prepared by dissolving or dispersing the polymerizable compound of the active energy ray curing type, the fiber-shaped carbon, the electrically conductive macromolecular compound, the photopolymerization initiator and various additive components which are added where desired such as monofunctional monomers polymerizable with active energy ray, antioxidants, ultraviolet light absorbents, photo-stabilizers, leveling agents, defoaming agents and coloring agents into a suitable solvent in respective specific amounts.

Examples of the monofunctional monomer polymerizable with active energy ray include cyclohexyl(meth)acrylate, 2-ethylhexyl (meth)acrylate, lauryl(meth)acrylate, stearyl (meth)acrylate, isobornyl (meth)acrylate and N-vinylpyrrolidone.

Examples of the solvent used in the above preparation include aliphatic hydrocarbons such as hexane and heptane, aromatic hydrocarbons such as toluene and xylene, halogenated hydrocarbons such as methylene chloride and ethylene chloride, alcohols such as methanol, ethanol, propanol, isopropanol and butanol, ketones such as acetone, methyl ethyl ketone, 2-pentanone, isophorone and cyclohexanone, ester-based solvents such as ethyl acetate and butyl acetate, ether-based solvents such as ethylcellosolve and glycol ether-based solvents such as ethylene glycol monoethyl ether.

The concentration and the viscosity of the composition prepared as described above are not particularly limited as long as the coating operation can be conducted and can be suitably selected in accordance with the situation.

The above composition is applied to the face of the substrate film opposite to the face having the releasing agent layer in accordance with a conventional process such as the bar coating process, the knife coating process, the roll coating process, the blade coating process, the die coating process and the gravure coating process to form a coating film. After the formed coating film is dried by heating where desired, the antistatic layer is formed by curing the coating film by irradiation with active energy ray.

As the active energy ray, an active light such as ultraviolet light is preferable. The ultraviolet light can be obtained by using a high voltage mercury lamp, a fusion H lamp or a xenon lamp. The amount of the irradiation is, in general, 100 to 500 mJ/cm$^2$.

The thickness of the antistatic layer formed as described above is, in general, 0.01 to 3 µm, preferably 0.03 to 1 µm and more preferably 0.03 to 0.5 µm from the standpoint of the balance between the antistatic property and the economy.

The surface resistivity of the antistatic layer is $10^{13}\,\Omega/\square$ or smaller and preferably $10^{10}\,\Omega/\square$ or smaller.

The present invention also provides a process for producing a release film which comprises forming an antistatic layer on one of faces of a substrate film by coating the face with a resin composition of an active energy ray curing type comprising fiber-shaped carbon, drying the formed layer to form a coating layer and irradiating the formed coating layer with an active energy ray to cure the coating layer, and forming a releasing agent layer on the other face of the substrate film by coating the face with a coating fluid comprising a releasing agent and drying the formed layer to form a releasing agent layer.

In the release film of the present invention, the releasing agent layer is disposed on one face of the substrate film and the antistatic layer comprising the fiber-shaped carbon and, occasionally, the electrically conductive macromolecular compound is disposed on the other face of the substrate film. The release film exhibits the excellent antistatic property and releasing function. The release film can be advantageously applied, for example, to the process film for producing films by casting of resins such as polyurethane resins, polyacrylic resins and polyvinyl chloride resins, the process film for molding of green sheets for laminated ceramic condensers and the protective film for pressure sensitive adhesives in pressure sensitive adhesive products.

EXAMPLES

The present invention will be described more specifically with reference to examples in the following. However, the present invention is not limited to the examples.

The properties of release films obtained in Examples and Comparative Examples were obtained in accordance with the following methods.

(1) Surface Resistivity

A sample obtained by cutting a release film prepared in Example or Comparative Example into a piece having a size of 100 mm×100 mm was treated for adjustment of moisture at 23° C. under 50% RH for 24 hours. The resistivity of the surface of the antistatic layer of the treated sample piece was measured in accordance with the method of Japanese Industrial Standard K 6911.

(2) Peeling Force

A pressure sensitive adhesive tape [manufactured by NITTO DENKO Co., Ltd.; the trade name: "31B TAPE"] was attached to the releasing agent layer of a release film prepared in Example or Comparative Example. After the obtained laminate was treated for adjustment of moisture at 23° C. under 50% RH for 24 hours, the treated laminate was cut into a piece having a length of 150 mm and a width of 20 mm. The release film in the laminate was peeled at an angle of 180° at a speed of 0.3 m/minute using a tensile tester, and the force necessary for the peeling (the peeling force) was measured.

(3) Detachment of a Releasing Agent Layer

Twenty-four hours after the formation of a releasing agent layer, the surface of a release film was strongly rubbed 10 times by a finger. The surface was examined by visual observation with respect to cloudiness and detachment, and it was found that the detachment of the releasing agent layer was present or absent. When the detachment was present, the curing was insufficient, and the strength of the coating film decreased.

(4) Smoothness

The arithmetic average roughness Ra of the surface of a releasing agent layer was measured using "SURFPAK-SV" manufactured by MITUTOYO Corporation in accordance with the method of Japanese Industrial Standard B 0601.

Example 1

A silicone resin of the thermosetting type [manufactured by SHIN-ETSU CHEMICAL Co., Ltd.; the trade name: "KS-847H"] in an amount of 100 parts by mass and 1 part by mass of a catalyst [manufactured by SHIN-ETSU CHEMICAL Co., Ltd.; the trade name: "CAT-PL-50T"] were diluted with toluene, and a solution having a concentration of solid components of 1.5% by mass was obtained. To the obtained solution, a fiber-shaped carbon having an average diameter of 15 nm and an average length of 1 μm [manufactured by JEMCO Inc.; the trade name: "CNF-T"; a tubular shape; a 3% by mass dispersion in cyclohexanone] was added in an amount such that the content in the entire solid components (the antistatic releasing agent layer) was 5% by mass, and a coating fluid was prepared.

The prepared coating fluid was applied uniformly to a polyethylene terephthalate (PET) film having a thickness of 38 μm [manufactured by MITSUBISHI POLYESTER FILM Corporation; the trade name: "T-100"] using a Mayer bar so that a coating layer having a thickness of 0.1 μm was formed after being dried. A releasing agent layer was formed by heating the formed coating layer in a drier at 130° C. for 1 minute, and a release film was prepared.

The properties of the prepared release film are shown in Table 1.

Example 2

A release film was prepared in accordance with the same procedures as those conducted in Example 1 except that the fiber-shaped carbon was added in an amount such that the content in the entire solid components was 10% by mass, and the properties of the prepared release film were evaluated. The results are shown in Table 1.

Example 3

A mixture of an alkyd resin modified with stearyl group and melamine modified with methyl group [manufactured by HITACHI KASEI POLYMER Co., Ltd.; the trade name: "TESFINE 303] in an amount of 100 parts by mass and 3 parts by mass of p-toluenesulfonic acid were added to toluene, and a solution having a concentration of solid components of 2% by mass was obtained. To the obtained solution, a fiber-shaped carbon having an average diameter of 15 nm and an average length of 1 μm [manufactured by JEMCO Inc.; the trade name: "CNF-T"; a tubular shape; a 3% by mass dispersion in cyclohexanone] was added in an amount such that the content in the entire solid components (the antistatic releasing agent layer) was 5% by mass, and a coating fluid was prepared.

The prepared coating fluid was applied uniformly to a polyethylene terephthalate (PET) film having a thickness of 38 μm [manufactured by MITSUBISHI POLYESTER FILM Corporation; the trade name: "T-100"] using a Mayer bar so that a coating layer having a thickness of 0.1 μm was formed after being dried. A releasing agent layer was formed by heating the formed coating layer in a drier at 140° C. for 1 minute, and a release film was prepared.

The properties of the prepared release film are shown in Table 1.

Example 4

A release film was prepared in accordance with the same procedures as those conducted in Example 3 except that the fiber-shaped carbon was added in an amount such that the content in the entire solid components was 10% by mass, and the properties of the prepared release film were evaluated. The results are shown in Table 1.

Example 5

To 100 parts by mass of cis-1,4-polybutadiene [manufactured by ZEON Coporation; the trade name: NIPOL BR 1241], 1 part by mass of antioxidant [manufactured by CIBA SPECIALTY CHEMICALS K. K.; the trade name: IRGANOX HP 2251] was added and the resultant mixture was diluted by toluene to obtain a coating fluid having a solid concentration of 0.5% by mass. To the obtained coating fluid, a fiber-shaped carbon having an average diameter of 15 nm and an average length of 1 μm [manufactured by JEMCO Inc.; the trade name: "CNF-T"; a tubular shape; a 3% by mass dispersion in cyclohexanone] was added in an amount such that the content in the entire solid components (the antistatic layer) was 5% by mass, and a coating fluid was prepared.

The prepared coating fluid was applied uniformly to a polyethylene terephthalate (PET) film having a thickness of 38 μm [manufactured by MITSUBISHI POLYESTER FILM Corporation; the trade name: "T-100"] using a Mayer bar so that a coating layer having a thickness of 0.1 μm was formed after being dried. The formed coating film was dried by heating in a drier at 100° C. for 30 seconds. Thereafter, the dried coating film was cured by irradiating with ultraviolet light from an apparatus for irradiation of ultraviolet light of the conveyor type equipped with a single fusion H bulb of 240 W/cm under the condition of a conveyor speed of 40 m/minute (the amount of irradiation: 100 mJ/cm$^2$), and an release layer was formed to obtain a release film.

The properties of the prepared release film are shown in Table 1.

Comparative Example 1

A release film was prepared in accordance with the same procedures as those conducted in Example 1 except that no carbon nano tube was used in the preparation of the coating fluid for forming the releasing agent layer, and the properties of the obtained release film was evaluated. The properties of the prepared release film are shown in Table 1.

Comparative Example 2

A release film was prepared in accordance with the same procedures as those conducted in Example 3 except that no carbon nano tube was used in the preparation of the coating fluid for forming the releasing agent layer, and the properties of the prepared release film were evaluated. The results are shown in Table 1.

Comparative Example 3

A release film was prepared in accordance with the same procedures as those conducted in Example 1 except that an antistatic agent comprising a quaternary ammonium salt was used in place of the fiber-shaped carbon in an amount such that the content in the entire solid components was 10% by mass in the preparation of the coating fluid for forming the releasing agent layer, and the properties of the prepared release film were evaluated. The results are shown in Table 1.

TABLE 1

| | Surface resistivity (Ω/□) | Peeling force (mN/20 mm) | Detachment of releasing agent layer | Smoothness [arithmetic average of surface roughness Ra] (nm) |
|---|---|---|---|---|
| Example 1 | $1.8 \times 10^9$ | 40 | absent | 40 |
| Example 2 | $7.3 \times 10^8$ | 40 | absent | 43 |
| Example 3 | $2.0 \times 10^9$ | 1300 | absent | 42 |
| Example 4 | $5.1 \times 10^8$ | 1310 | absent | 43 |
| Example 5 | $2.0 \times 10^9$ | 50 | absent | 40 |
| Comparative Example 1 | $2.3 \times 10^{15}$ | 40 | absent | 36 |
| Comparative Example 2 | $6.6 \times 10^{16}$ | 1290 | absent | 38 |

TABLE 1-continued

|  | Surface resistivity (Ω/□) | Peeling force (mN/20 mm) | Detachment of releasing agent layer | Smoothness [arithmetic average of surface roughness Ra] (nm) |
|---|---|---|---|---|
| Comparative Example 3 | $6.6 \times 10^9$ | 95 | present | 44 |

Example 6

A solution containing 75 parts by mass of an acrylic monomer containing dipentaerythritol hexaacrylate, pentaerythritol hexaacrylate and N-vinylpyrrolidone in relative amounts by mass of 45:20:10, 20 parts by mass of butyl acetate and 30 parts by mass of isopropanol in an amount of 125 parts by mass, 15.5 parts by mass of an aqueous solution containing 1.3% by mass of an electrically conductive macromolecular compound which was polyethylenedioxythiophene/polystyrenesulfonate (PEDT/PSS) and 0.2 parts by mass of a photopolymerization initiator which was α-hydroxycyclohexylphenylmethanone were mixed together. The resultant mixture was diluted with isopropanol so that that the total of the contents of the acrylic monomers and the electrically conductive macromolecular compound was 1% by mass, and a resin composition of the photo-curing type was prepared.

To the obtained resin composition of the photo-curing type, a fiber-shaped carbon having an average diameter of 15 nm and an average length of 1 μm [manufactured by JEMCO Inc.; the trade name: "CNF-T"; a tubular shape; a 3% by mass dispersion in isopropanol] was added in an amount such that the content in the entire solid components (the antistatic layer) was 1% by mass, and coating fluid I was prepared.

Prepared coating fluid I was applied uniformly to a polyethylene terephthalate (PET) film having a thickness of 38 μm [manufactured by MITSUBISHI POLYESTER FILM Corporation; the trade name: "T-100"] using a Mayer bar so that a coating layer having a thickness of 0.05 μm was formed after being dried. The formed coating layer was heated by a drier at 55° C. for 1 minute and, immediately thereafter, irradiated with ultraviolet light from an apparatus for irradiation of ultraviolet light of the conveyor type equipped with a single fusion H bulb of 240 W/cm under the condition of a conveyor speed of 10 m/minute (the amount of irradiation: 400 mJ/cm$^2$), and an antistatic layer was formed.

Separately, 100 parts by mass of a silicone of the thermosetting type [manufactured by SHIN-ETSU CHEMICAL Co., Ltd.; the trade name: "KS-84H"] and 1 part by mass of a catalyst [[manufactured by SHIN-ETSU CHEMICAL Co., Ltd.; the trade name: "CAT-PL-50T"] were diluted with toluene, and coating fluid II having a concentration of solid components of 1.1% by mass was prepared.

Prepared coating fluid II was applied uniformly to the face of the PET film opposite to the face having the antistatic layer so that a coating layer having a thickness of 0.1 μm was formed after being dried. A releasing agent layer was formed by heating the formed coating layer in a drier at 130° C. for 1 minute, and a release film was prepared.

The properties of the prepared release film are shown in Table 2.

Example 7

A release film was prepared in accordance with the same procedures as those conducted in Example 6 except that a solution prepared by diluting a coating material of the photo-curing type [manufactured by IDEMITSU TECHNOFINE Co., Ltd.; the trade name: "EL COAT 515"] so that the content was 1% by mass was used. The coating material of the photo-curing type was constituted with an aqueous solution of an electrically conductive macromolecular compound (PEDT/PSS), a photo-initiator (α-hydroxycyclohexylphenylmethanone), a solution containing acrylic oligomers and acrylic monomers (dipenta-erythritol hexaacrylate, pentaerythritol hexaacrylate and N-vinyl-pyrrolidone) and a solvent for dissolving these components which was composed of ethylene glycol monoethyl ether and isopropanol.

The properties of the prepared release film are shown in Table 2.

Example 8

A release film was prepared in accordance with the same procedures as those conducted in Example 7 except that the thickness of the antistatic layer was 0.1 μm, and the properties of the obtained release film were evaluated. The results are shown in Table 2.

Example 9

A release film was prepared in accordance with the same procedures as those conducted in Example 7 except that the releasing agent layer was prepared as described in the following, and the properties of the obtained release film were evaluated. The results are shown in Table 2.

A mixture of an alkyd resin modified with stearyl group and melamine modified with methyl group [manufactured by HITACHI KASEI POLYMER Co., Ltd.; the trade name: "TESFINE 303] in an amount of 100 parts by mass and 3 parts by mass of p-toluenesulfonic acid were added to toluene, and coating fluid II having a concentration of solid components of 2% by mass was obtained. A releasing agent layer was formed by applying coating fluid II and heating the formed coating film at 140° C. for 1 minute.

Example 10

A release film was prepared in accordance with the same procedures as those conducted in Example 9 except that the thickness of the antistatic layer was 0.1 μm, and the properties of the obtained release film were evaluated. The results are shown in Table 2.

Example 11

A release film was prepared in accordance with the same procedures as those conducted in Example 6 except that no solution of an electrically conductive macromolecular compound was used, and the fiber-shaped carbon was used in an amount such that the content in the entire solid components (the antistatic layer) was 10% by mass, and the properties of the prepared release film were evaluated. The results are shown in Table 2.

Comparative Example 4

A release film was prepared in accordance with the same procedures as those conducted in Example 6 except that no antistatic layer was formed, and the properties of the obtained release film were evaluated. The results are shown in Table 2.

Comparative Example 5

A release film was prepared in accordance with the same procedures as those conducted in Example 9 except that no antistatic layer was formed, and the properties of the obtained release film were evaluated. The results are shown in Table 2.

TABLE 2

| | Antistatic layer | | | | | Smoothness Arithmetic average of surface roughness Ra(nm) | |
|---|---|---|---|---|---|---|---|
| | Type of releasing agent layer | thickness (μm) | conductive macro-molecular compound | fiber-shaped carbon | Surface resistivity (Ω/□) | Peeling force (mN/20 mm) | releasing agent layer (nm) | antistatic layer (nm) |
| Example 6 | silicone | 0.05 | present | present | $4.3 \times 10^8$ | 40 | 40 | 40 |
| Example 7 | silicone | 0.05 | present | present | $1.2 \times 10^8$ | 40 | 36 | 43 |
| Example 8 | silicone | 0.10 | present | present | $5.1 \times 10^7$ | 40 | 38 | 40 |
| Example 9 | alkyd | 0.05 | present | present | $3.0 \times 10^8$ | 1200 | 36 | 43 |
| Example 10 | alkyd | 0.10 | present | present | $6.7 \times 10^7$ | 1310 | 36 | 36 |
| Example 11 | silicone | 0.05 | absent | present | $5.0 \times 10^{12}$ | 40 | 38 | 38 |
| Comparative Example 4 | silicone | 0 | — | — | $2.1 \times 10^{15}$ | 40 | 40 | 37* |
| Comparative Example 5 | alkyd | 0 | — | — | $2.2 \times 10^{15}$ | 1200 | 36 | 39* |

*Since the other face was not treated in Comparative Examples 4 and 5, the results of the measurement on the PET substrate are shown.

INDUSTRIAL APPLICABILITY

The release film as the first embodiment of the present invention has the antistatic releasing agent layer comprising fiber-shaped carbon and disposed on at least one of the faces of the substrate film. The release film as the second embodiment of the present invention has the releasing agent layer disposed on one of the faces of the substrate film and an antistatic layer comprising the fiber-shaped carbon and disposed on the other face of the substrate film and simultaneously exhibits the excellent antistatic property and releasing property. Both films exhibit the stable antistatic function, has the excellent smoothness and exhibit the excellent releasing property. The release films can be applied to the process film for producing films by casting of resins such as polyurethane resins, polyacrylic resins and polyvinyl chloride resins, the process film for molding of green sheets for laminated ceramic condensers and the protective film for pressure sensitive adhesives in pressure sensitive adhesive products.

What is claimed is:

1. A release film which comprises a substrate film and an antistatic releasing agent layer comprising a fiber-shaped carbon and a releasing agent, wherein the antistatic releasing agent layer is disposed on one face of the substrate film, and the fiber-shaped carbon is contained in the antistatic releasing agent layer in an amount of 0.1 to 30% by mass.

2. The release film according to claim 1, wherein the releasing agent is a silicone-based releasing agent.

3. The release film according to claim 1, wherein the releasing agent is an agent selected from the group consisting of a releasing agent based on a compound having a long chain alkyl group, an alkyd resin-based releasing agent, an olefin resin-based releasing agent, a rubber-based releasing agent and an acrylic releasing agent.

4. The release film according to claim 1, wherein the antistatic releasing agent layer has a surface resistivity of $10^{12}\Omega/\square$ or smaller.

5. The release film according to claim 1, wherein the antistatic releasing agent layer has a thickness of 0.01 to 3 μm.

6. The release film according to claim 1, wherein the fiber-shaped carbon is a carbon nano tube which is a cylindrical hollow fiber-shaped material having an average outer diameter of about 0.5 to 120 nm and an average length of about 50 nm or greater.

7. The release film according to claim 1, wherein the fiber-shaped carbon is a carbon nano tube which is a cylindrical hollow fiber-shaped material having an average outer diameter of about 0.5 to 120 nm and an average length of about 50 nm or greater.

8. The release film according to claim 7, wherein the releasing agent is a silicone-based releasing agent.

9. The release film according to claim 1, wherein the antistatic releasing agent layer has a surface resistivity of $10^{12}\Omega/\square$ or smaller; and the antistatic layer has a thickness of 0.01 to 3 μm.

10. A process for producing a release film which comprises a substrate film and an antistatic releasing agent layer comprising a fiber-shaped carbon and a releasing agent, wherein the process comprises coating one face of the substrate film with a coating fluid comprising the releasing agent and the fiber-shaped carbon to form a coating layer and drying the coating layer to form the antistatic releasing agent layer, wherein the fiber-shaped carbon is contained in the antistatic releasing agent layer in an amount of 0.1 to 30% by mass.

11. A release film which comprises a substrate film, an antistatic layer comprising a fiber-shaped carbon and a releasing agent layer, wherein the antistatic layer is disposed on one face of the substrate film and comprises a cured product of a resin composition of an active energy ray curing type comprising the fiber-shaped carbon, and the releasing agent layer is disposed on a face of the substrate film opposite to a face having the antistatic layer disposed thereon, wherein the fiber-shaped carbon is contained in the antistatic layer in an amount of 0.1 to 30% by mass.

12. The release film according to claim 11, wherein the resin composition of an active energy ray curing type further comprises an electrically conductive macromolecular compound.

13. The release film according to claim 12, wherein the electrically conductive macromolecular compound is at least one compound selected from the group consisting of a polyacetylene-based compound, a polythiophene-based compound, a polyaniline-based compound, a polypyrrol-based compound, a poly(phenylenevinylene)-based compound, a poly(vinylene sulfide)-based compound, a poly(p-phenylene sulfide)-based compound and a poly(thienylenevinylene)-based compound.

14. The release film according claim 13, wherein the fiber-shaped carbon is a carbon nano tube which is a cylindrical hollow fiber-shaped material having an average outer diameter of about 0.5 to 120 nm and an average length of about 50 nm or greater.

15. The release film according to claim 14, wherein the electrically conductive macromolecular compound is contained in the cured product in an amount of 0.01 to 10% by mass; the antistatic layer has a surface resistivity of $10^{13}\Omega/\square$ or smaller; and the antistatic layer has a thickness of 0.01 to 3 µm.

16. The release film according to claim 12, wherein the electrically conductive macromolecular compound is contained in the cured product in an amount of 0.01 to 10% by mass.

17. The release film according to claim 11, wherein the antistatic layer has a surface resistivity of $10^{13}\Omega/\square$ or smaller.

18. The release film according to claim 11, wherein the antistatic layer has a thickness of 0.01 to 3 µm.

19. The release film according to claim 11, wherein the releasing agent is a silicone-based releasing agent.

20. The release film according claim 11, wherein the releasing agent is selected from the group consisting of a releasing agent based on a compound having a long chain alkyl group, an alkyd resin-based releasing agent, an olefin resin-based releasing agent, a rubber-based releasing agent and an acrylic releasing agent.

21. The release film according to claim 11, wherein the releasing agent layer has a thickness of 0.01 to 3 µm.

22. A process for producing a release film which comprises a substrate film, an antistatic layer comprising a cured product of a resin composition of an active energy ray curing type comprising a fiber-shaped carbon and a releasing agent layer, wherein the process comprises forming an antistatic layer on one face of a substrate film by coating the face with the resin composition to form a coating layer, drying the coating layer to form a coating film and irradiating the coating film with an active energy ray to cure the coating film, and forming a releasing agent layer on an other face of the substrate film by coating the other face with a coating fluid comprising a releasing agent and drying the coating fluid to form a layer, wherein the fiber-shaped carbon is contained in the antistatic layer in an amount of 0.1 to 30% by mass.

23. The release film according to claim 11, wherein the fiber-shaped carbon is a carbon nano tube which is a cylindrical hollow fiber-shaped material having an average outer diameter of about 0.5 to 120 nm and an average length of about 50 nm or greater.

24. The release film according to claim 11, wherein the resin composition of the active energy ray curing type comprises a polymerizable compound of the active energy ray curing type, which is at least one compound selected from the group consisting of a monomer which is polymerizable with an active energy ray and having two or more polymerizable unsaturated groups in a molecule, and an oligomer which is polymerizable with an active energy ray and having two or more polymerizable unsaturated groups in a molecule.

25. The release film according to claim 24, wherein the active energy ray is an active light and the resin composition further comprises a photopolymerization initiator.

* * * * *